Patented Dec. 19, 1950

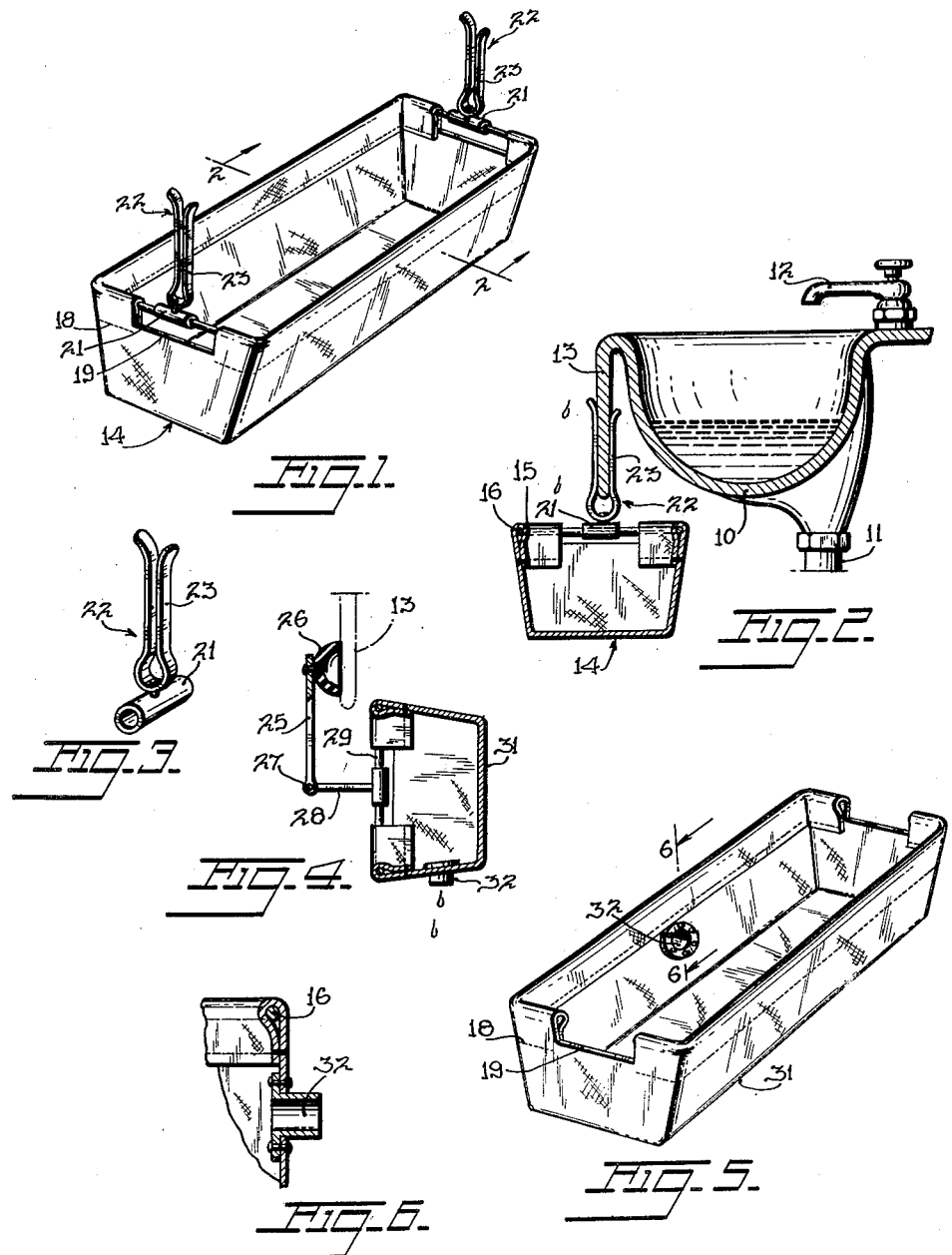

2,534,793

UNITED STATES PATENT OFFICE 2,534,793

DRIP PAN ATTACHMENT FOR SINKS

Eric Olson, Jersey City, N. J.

Application June 19, 1947, Serial No. 755,571

7 Claims. (Cl. 4—187)

This invention relates to a removable sink attachment for catching drips of water from the sink so that they will not drop to the floor.

It is an object of the present invention to provide a sink attachment which can be removably mounted on the side edge of the sink to depend from the bottom thereof and which when in place will catch any of the drips of water which may pass over the sink before they have an opportunity to drop on the floor, whereby to always keep the floor about a sink in a dry condition and such that the floor will not be harmed by water.

It is another object of the present invention to provide a removable sink attachment which is of simple construction, inexpensive to manufacture and efficient in operation.

According to the invention, a drip pan is formed with an attachable means thereon which will engage with the side edge of the sink to depend from the bottom thereof so that the drip pan will be retained in a suspended position under the edge of the sink and extended outwardly therefrom to catch any of the drips of water which leave top of the sink. The drip pan can be made of metal or of flexible plastic or cloth material but is waterproof and will retain any of the drops of water which have entered the same. The drip pan may have a rod extending around the rim and to this rod there is connected a sleeve with a clothespin-like projection thereon adapted to be slid upwardly over the side of the sink to retain the drip pan thereupon by the frictional engagement of the portions of the clothespin-like projection upon the side faces of the sink edge.

In another form of the invention, the engagement of the engagement of the drip pan with the sink edge may include a vacuum cup element and the pan can be pivoted with respect to a bracket member on the cup element so that it can be adjusted inwardly and out of the way when the pan is not in use or for the purpose of draining water from the same, such pan having a drain hole therein at one side thereof so that as the drip pan is pivoted by lowering its front edge, water can be drained off into a pail.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a perspective view of a drip pan having one form of attaching means thereon.

Fig. 2 is a cross sectional view of a sink and of a drip pan as viewed on line 2—2 of Fig. 1.

Fig. 3 is a perspective view of the attaching means for the drip pan shown in the form of the invention in Fig. 1.

Fig. 4 is a cross sectional view of a modified form of attaching means including a vacuum cup and an adjustable bracket to permit the tilting downwardly of the forward edge of the pan to drain water therefrom or to move the pan to an out of use position.

Fig. 5 is a perspective view of the pan used with the form of the invention shown in Fig. 4.

Fig. 6 is a cross sectional view taken on line 6—6 of Fig. 5.

Referring now particularly to Figs. 1, 2 and 3, 10 represents a sink having the usual drain 11 and a spigot 12 from which water is fed into the sink. The forward edge of the sink has the usual turn down side portion 13 to which may be connected the drip pan arrangement 14. This arrangement 14 includes a pan having a top edge 15 with a wire extended therearound as indicated at 16 to render the top edge of the pan rigid, stiff, and open, should the pan be formed of flexible or pliable material. A hem 17 may be extended over the wire 16 and stitched as indicated at 18. At the opposite ends of the pan there are open spaces 19 to provide access to the wire 16 and on which sleeves 21 of attaching means 22 are fitted. The attaching means 22 have clothespin-like attaching portions 23 adapted to slide upwardly on opposite faces of the sink edge 13 whereby to frictionally connect the attaching means 22 with the sink edge 13. The pan 14 will extend outwardly from the sink edge and drops will enter the same which leave the top edge of the sink 10. When the pan becomes filled, the same can be readily detached from the sink and the water poured out of the same.

Referring now particularly to modification of the invention shown in Figs. 4, 5 and 6, a bracket 25 having a vacuum cup 26 thereon is connected to the front face of the side edge 13. Hinged to the lower end of the bracket 25 by a pin 27 is an arm 28 which is connected to a wire 29 extending through the top hem of a pan 31 constructed similarly to the pan shown in Fig. 1 except that it has on the forward side thereof, a drain pipe 32 from which water can be poured out of the pan as the pan and the arm are pivoted upwardly and rearwardly. If the pin connection 27 of the bracket 25 and arm 28 is sufficiently tight, the same will retain the pan 31 in its rearwardly extended position as shown in Fig. 4, by friction.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A drip pan arrangement for a sink, comprising a drip pan, attaching means fixed to the top of the drip pan and adapted to be releasably extended over the edge of a sink whereby to removably secure the drip pan thereupon, said attaching means including a portion secured to the pan and a clothespin-like portion adapted to slide upwardly over opposite faces of the sink edge.

2. A drip pan arrangement for a sink, comprising a drip pan, attaching means fixed to the top of the drip pan and adapted to be releasably extended over the edge of a sink whereby to removably secure the drip pan thereupon, said pan having a wire extending through the top edge, said attaching means including a sleeve portion extended over the wire at the ends of the pan, said attaching means further having a clothespin-like portion adapted to be slid upwardly over the opposite faces of the depending sink edge.

3. A drip pan arrangement for a sink, comprising a drip pan, attaching means fixed to the top of the drip pan and adapted to be releasably extended over the edge of a sink whereby to removably secure the drip pan thereupon, said attaching means including a bracket with a vacuum cup member thereon adapted to engage with the depending sink edge, and said pan connected to the bracket to extend outwardly from the sink edge.

4. A drip pan arrangement for a sink, comprising a drip pan, attaching means fixed to the top of the drip pan and adapted to be releasably extended over the edge of a sink whereby to removably secure the drip pan thereupon, and means for connecting the pan to the attaching means so that the pan can be pivoted upwardly and rearwardly to permit the contents of the pan to be drained therefrom.

5. A drip pan arrangement for a sink, comprising a drip pan, attaching means fixed to the top of the drip pan and adapted to be releasably extended over the edge of a sink whereby to removably secure the drip pan thereupon, said attaching means including a bracket connected to the sink edge, an arm pivotally connected to the bracket for rearward swinging movement, and the pan being attached to the arm whereby as the arm and pan are swung backwardly, the contents of the pan can be drained therefrom.

6. A drip pan arrangement for a sink, comprising a drip pan, attaching means fixed to the top of the drip pan and adapted to be releasably extended over the edge of a sink whereby to removably secure the drip pan thereupon, said attaching means including a bracket connected to the sink edge, an arm pivotally connected to the bracket for rearward swinging movement, the pan being attached to the arm whereby as the arm and pan are swung backwardly, the contents of the pan can be drained therefrom, and said pan having a drain pipe in the side thereof through which the contents can be drained.

7. A drip pan for a sink having a depending front edge portion, comprising an elongated pan having elongated front and rear walls and narrow end walls, and means mounted on the top edges of said end walls intermediate said front and rear walls for engagement with the depending front edge portion to support the pan beneath the depending front edge portion with said front wall located slightly forward of the depending front edge portion and with said rear wall located slightly rearward of the depending edge portion so that drops of water dropping from the depending edge will be caught in said pan.

ERIC OLSON.

REFERENCES CITED

The following references are of record in the file of this patent:

UNITED STATES PATENTS

| Number | Name | Date |
| --- | --- | --- |
| 1,234,658 | Gray | July 24, 1917 |
| 1,985,658 | Heise et al. | Dec. 25, 1934 |
| 2,347,760 | Wulstein | May 2, 1944 |